US012270363B2

(12) United States Patent
Yamada et al.

(10) Patent No.: US 12,270,363 B2
(45) Date of Patent: Apr. 8, 2025

(54) ENGINE

(71) Applicant: SUZUKI MOTOR CORPORATION, Hamamatsu (JP)

(72) Inventors: Shinichi Yamada, Hamamatsu (JP); Atsushi Sakane, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/599,705

(22) Filed: Mar. 8, 2024

(65) Prior Publication Data

US 2024/0301848 A1 Sep. 12, 2024

(30) Foreign Application Priority Data

Mar. 9, 2023 (JP) ................................. 2023-036690

(51) Int. Cl.
*F02M 35/16* (2006.01)
*F01N 13/10* (2010.01)

(52) U.S. Cl.
CPC ........... *F02M 35/162* (2013.01); *F01N 13/10* (2013.01)

(58) Field of Classification Search
CPC ............................. F02M 35/162; F01N 13/10
See application file for complete search history.

(56) References Cited

U.S. PATENT DOCUMENTS

| 9,061,579 B2 | 6/2015 | Yamagishi ............. B60K 13/02 |
| 10,774,754 B2 | 9/2020 | Mori et al. ............. F02D 9/107 |
| 2008/0230030 A1 | 9/2008 | Kawai et al. ............ 123/184.21 |
| 2017/0113758 A1 | 4/2017 | Hamaguchi et al. .... B62M 7/02 |
| 2020/0080498 A1* | 3/2020 | Mori ....................... F02D 9/107 |

FOREIGN PATENT DOCUMENTS

JP 5018164 B2 6/2012

OTHER PUBLICATIONS

Vital MX, "Motorcycle Tech Tips/How-To: Throttle Body." https://www.youtube.com/watch?v=Wod4XVfgsSU, Aug. 7, 2017 (Year: 2017).*
Extended European Search Report mailed Jul. 4, 2024, issued to European Application No. 24162231.5.

* cited by examiner

Primary Examiner — Kevin A Lathers
(74) Attorney, Agent, or Firm — Stein IP, LLC

(57) ABSTRACT

An engine includes a cylinder and a cylinder head stacked on an upper portion of a crankcase, an electronically controlled throttle interposed in an intake passage behind the cylinder head, and an exhaust pipe extending rearward from the cylinder head through a side of the cylinder. The electronically controlled throttle includes a throttle valve provided in the intake passage and an actuator that opens and closes the throttle valve. The actuator is disposed on an opposite side of the exhaust pipe with respect to a vehicle center line extending in a vehicle front-rear direction.

7 Claims, 6 Drawing Sheets

ENGINE

CROSS-REFERENCE TO RELATED APPLICATIONS

This application is based on and claims priority under 35 USC 119 from Japanese Patent Application No. 2023-036690 filed on Mar. 9, 2023, the entire content of which is incorporated herein by reference.

TECHNICAL FIELD

The present invention relates to an engine.

BACKGROUND ART

A straddle-type vehicle in which an exhaust pipe is passed through a side of a cylinder is known (see, for example, JP5018164B2). In the straddle-type vehicle described in JP5018164B2, a cylinder, a cylinder head, and a cylinder head cover are stacked on an upper portion of a crankcase of an engine. An exhaust pipe is connected to a front surface of the cylinder head, and the exhaust pipe curves downward from the cylinder head, and then passes through a side of the cylinder and extends toward a rear side of the vehicle. The exhaust pipe extends below a seat, and an up-type muffler which is tilted diagonally upward and rearward is connected to a downstream end of the exhaust pipe.

In the straddle-type vehicle described in JP5018164B2, an intake device is provided on a rear surface side of the cylinder head. Therefore, when an electronically controlled throttle is employed in the engine described in JP5018164B2, an actuator of the electronically controlled throttle may be brought close to the exhaust pipe and exposed to heat. In order to move the actuator away from the exhaust pipe, it is necessary to raise a seat height and lengthen a wheelbase.

SUMMARY OF INVENTION

The present invention has been made in view of the above, and an object of the present invention is to provide an engine that can prevent heat damage to an actuator of an electronically controlled throttle in a vehicle with an up-type muffler without increasing a size of the vehicle.

According to an advantageous aspect of the present invention, there is provided an engine, including:
a cylinder and a cylinder head stacked on an upper portion of a crankcase;
an electronically controlled throttle interposed in an intake passage behind the cylinder head; and
an exhaust pipe extending rearward from the cylinder head through a side of the cylinder, wherein
the electronically controlled throttle includes a throttle valve provided in the intake passage and an actuator that opens and closes the throttle valve, and
the actuator is disposed on an opposite side of the exhaust pipe with respect to a vehicle center line extending in a vehicle front-rear direction.

According to the engine of one aspect of the present invention, even when the electronically controlled throttle is interposed in the intake passage and the exhaust pipe passes on the side of the cylinder, the actuator of the electronically controlled throttle is sufficiently spaced from the exhaust pipe in the vehicle width direction. The actuator can be moved away from the exhaust pipe without raising the seat height or lengthening the wheelbase. Therefore, even in a vehicle with an up-type muffler, heat damage to the actuator can be prevented while preventing the increase in size and width of the vehicle.

DESCRIPTION OF EMBODIMENTS

In an engine according to one aspect of the present invention, a cylinder and a cylinder head are stacked on an upper portion of a crankcase. An electronically controlled throttle is interposed in an intake passage behind the cylinder head, and an exhaust pipe extends rearward from the cylinder head through a side of the cylinder. The electronically controlled throttle is provided with an actuator that opens and closes a throttle valve in the intake passage. Since the actuator is disposed on an opposite side of the exhaust pipe with respect to a vehicle center line extending in a vehicle front-rear direction, even though the exhaust pipe passes through the side of the cylinder, the actuator of the electronically controlled throttle is well spaced from the exhaust pipe in a vehicle width direction. The actuator can be arranged away from the exhaust pipe without raising the seat height or lengthening the wheelbase. Therefore, even in a vehicle with an up-type muffler, heat damage to the actuator can be prevented while preventing the increase in size and width of the vehicle.

Embodiment

Figure 1:
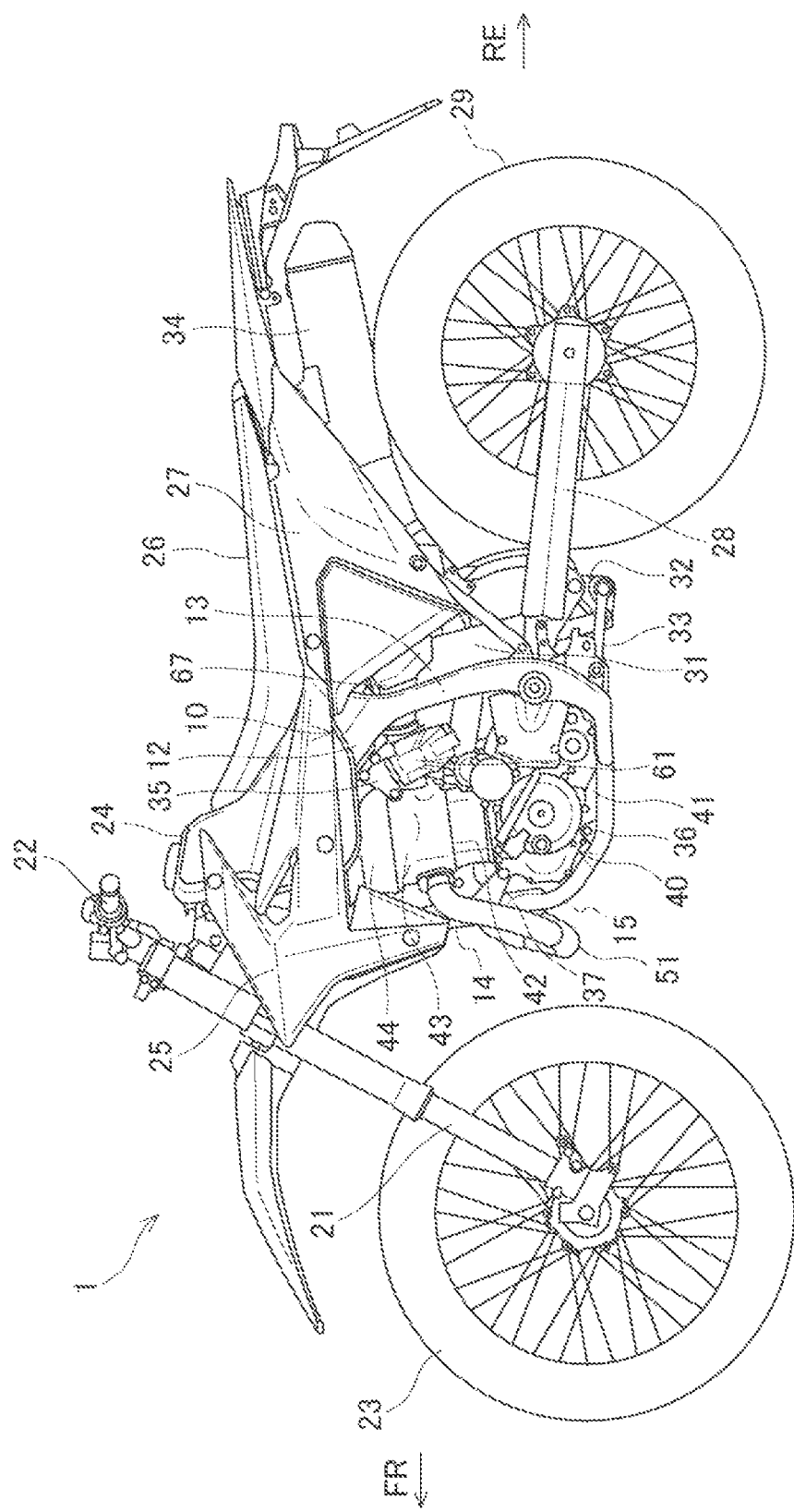
FIG. 1 is a left side view of a straddle-type vehicle of an embodiment.

A straddle-type vehicle provided with a front cowling according to the present embodiment will be described below with reference to the accompanying drawings. FIG. 1 is a left side view of the straddle-type vehicle of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 40 and an electrical system mounted on a vehicle body frame 10. A pair of main frames 12 extend rearward and diagonally downward from a head pipe 11 (see FIG. 5) of the vehicle body frame 10, and rear portions of the pair of main frames 12 form a pair of body frames 13 bent downward. A down frame 14 extends downward from the head pipe 11, and a pair of under frames 15 bent rearward are connected to a lower portion of the down frame 14. Rear end portions of the pair of under frames 15 are connected to lower portions of the pair of body frames 13, so that the vehicle body frame 10 is formed into a cradle shape.

A front fork 21 is steerably supported by the head pipe 11 via a steering shaft (not shown). A handle 22 is provided at an upper portion of the front fork 21, and a front wheel 23 is rotatably supported at a lower portion of the front fork 21. A fuel tank 24 is placed over upper portions of the pair of main frames 12, and the main frames 12 and the fuel tank 24 are laterally covered by a front side cover 25. A seat 26 is displaced behind the fuel tank 24, and a seat frame that supports the seat 26 from below is laterally covered by a rear side cover 27.

A swing arm 28 is swingably supported at an intermediate portion of the body frames 13. The swing arm 28 extends rearward from the body frames 13, and a rear wheel 29 is rotatably supported at a rear end of the swing arm 28. A front side of the swing arm 28 and a lower portion of a rear suspension 31 are connected via a triangular cushion lever 32. The cushion lever 32 and the body frame 13 are connected via a cushion rod 33. As the rear suspension 31 expands and contracts as the swing arm 28 swings, unevenness on a road surface is absorbed, vibration is reduced, and a road holding characteristic between the rear wheel 29 and the road surface is improved.

The engine 40 is a four-stroke, single-cylinder engine, and is suspended inside the vehicle body frame 10 via suspension brackets 35 to 37. A cylinder assembly in which a cylinder 42, a cylinder head 43, and a cylinder head cover 44 are stacked is attached to an upper portion of a crankcase 41 of the engine 40. An intake device such as an air cleaner 67 is displaced behind the cylinder head 43. An exhaust pipe 51 is connected to a front surface of the cylinder head 43. The exhaust pipe 51 extends rearward passing through a side of the cylinder 42, and an up-type muffler 34 tilted diagonally upward and rearward is connected to a downstream end of the exhaust pipe 51.

Models which adopt electronically controlled throttles to comply with exhaust gas regulation and improve drivability are increased. When an electronically controlled throttle is adopted in a model with a down-type muffler, it is necessary to raise a seat height to ensure minimum ground clearance, and an under guard is required to protect the muffler, which increases weight. In the present embodiment, an electronically controlled throttle 61 is adopted for a model with an up-type muffler 34 such as an off-road type. In order to prevent heat damage caused by the exhaust pipe 51, an electronically controlled throttle 61 is disposed in a space in a vehicle width direction.

Figure 2:
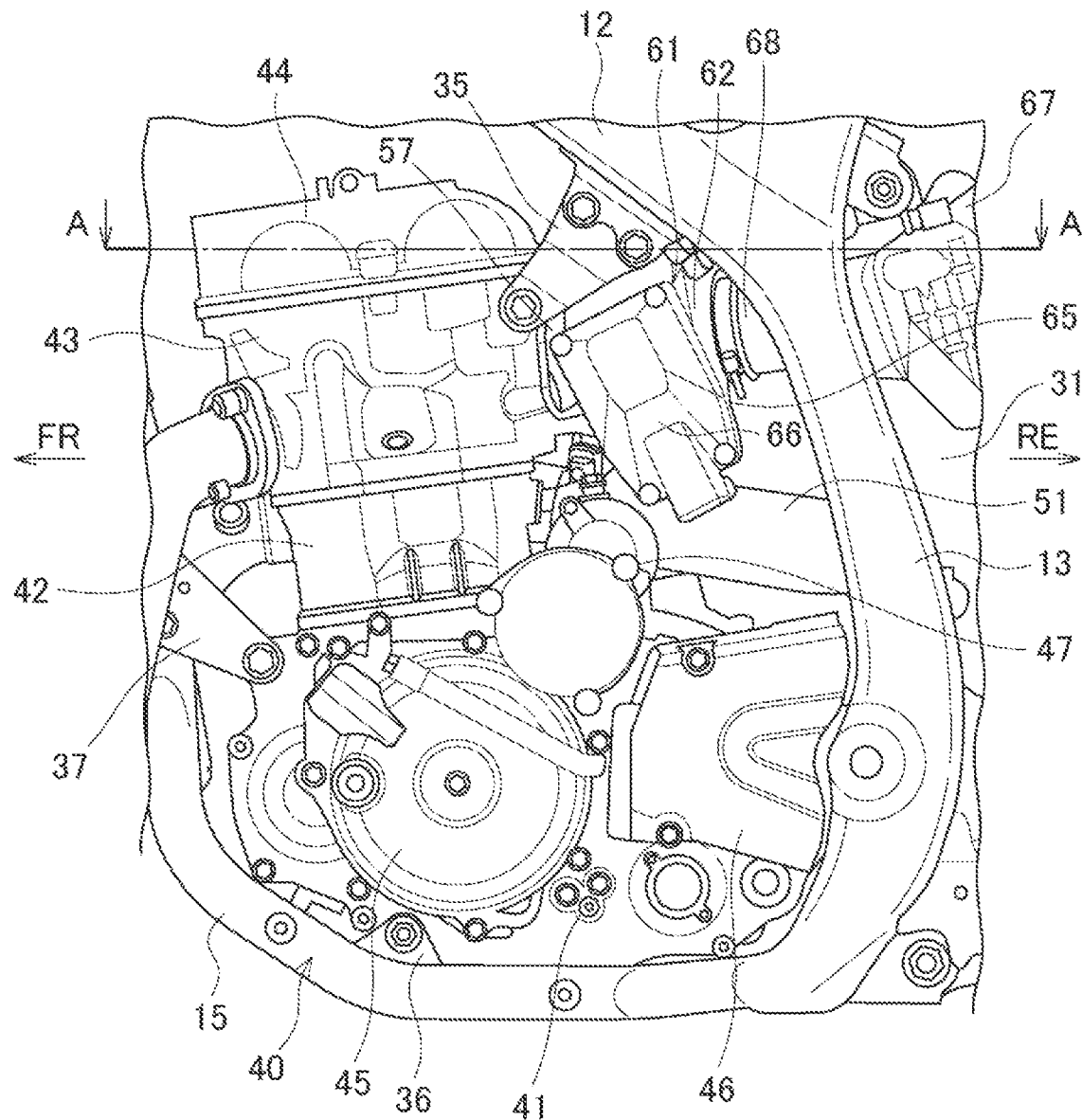
FIG. 2 is a left side view of an engine of the present embodiment.
Figure 3:
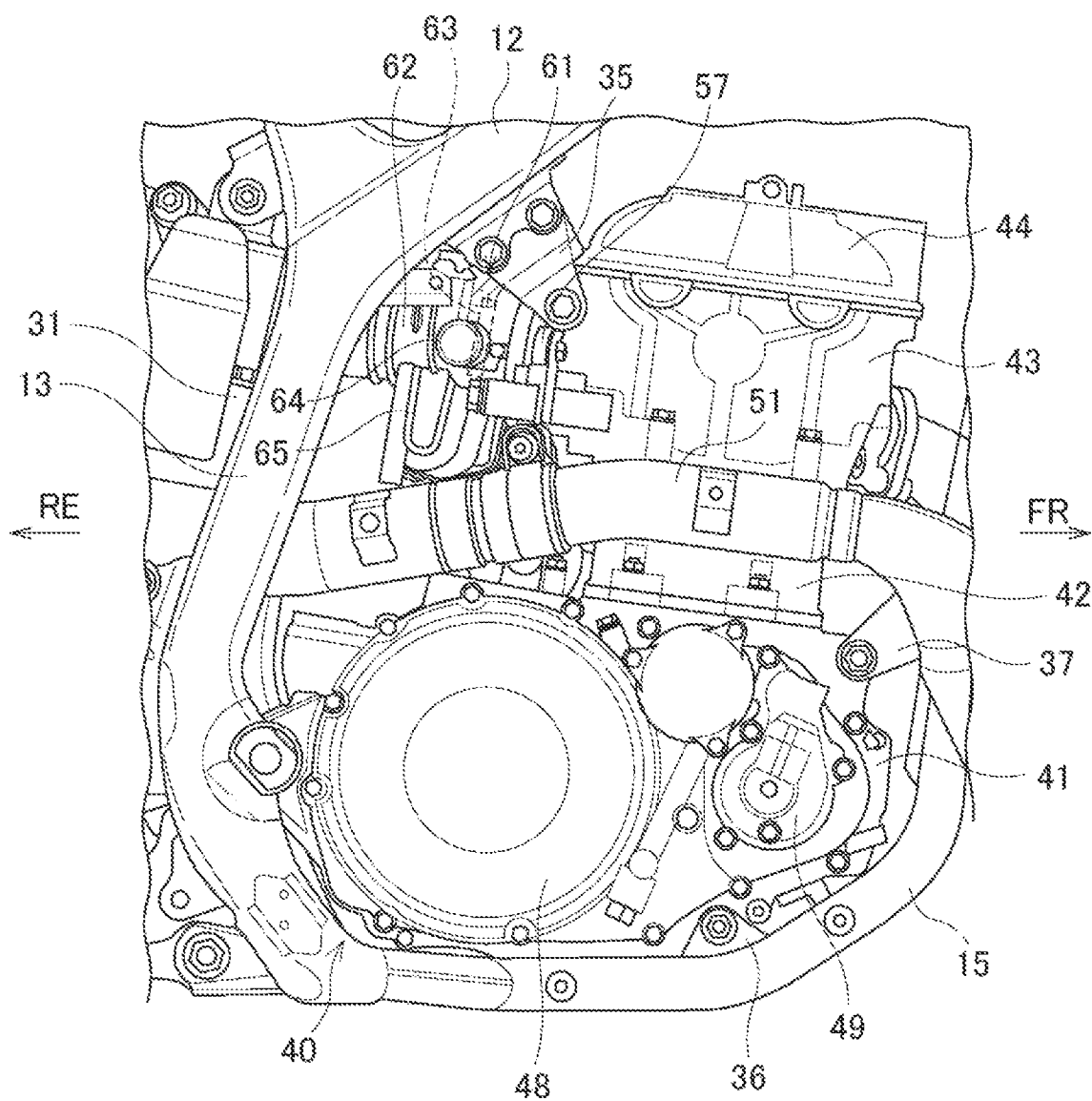
FIG. 3 is a right side view of the engine of the present embodiment.

The engine of the present embodiment will be described with reference to FIGS. 2 and 3. FIG. 2 is a left side view of the engine of the present embodiment. FIG. 3 is a right side view of the engine of the present embodiment.

As shown in FIGS. 2 and 3, the crankcase 41 has a left-right split structure constituted by a pair of left and right half cases. The crankcase 41 supports various shafts such as a crankshaft. The cylinder 42 is fixed to an upper surface of the crankcase 41, the cylinder head 43 is fixed to an upper surface of the cylinder 42, and the cylinder head cover 44 is fixed to an upper surface of the cylinder head 43. A valve gear is accommodated inside the cylinder head 43 and the cylinder head cover 44. The cylinder head 43 and the crankcase 41 are suspended on the vehicle body frame 10 by the suspension brackets 35 to 37.

A magneto cover 45 that covers a magneto (not shown) from a side is attached to a left side surface of the crankcase 41. A sprocket cover 46 is attached to a rear side of the magneto cover 45 to cover a part of a drive chain (not shown) for driving the rear wheel and a drive sprocket (not shown) from the side. A starter motor 47 for starting the engine 40 is attached to a rear side of the cylinder 42 and below the suspension bracket 35. A clutch cover 48 that covers a clutch (not shown) from a side is attached to a right side surface of the crankcase 41. A water pump 49 that sends cooling water to the engine 40 is attached to a front side of the clutch cover 48.

The air cleaner 67 is connected to a rear surface of the cylinder head 43 via an intake pipe 57 and the electronically controlled throttle 61. The air cleaner 67 is provided with a filter, and air taken in from an inlet tube (not shown) is filtered by the filter. Clean air is sent from the air cleaner 67 to a throttle body 62 of the electronically controlled throttle 61 through an outlet tube 68, and air is supplied from the throttle body 62 to the cylinder head 43 through the intake pipe 57. In this way, an intake passage 56 (see FIG. 6), which is constituted by the outlet tube 68, the throttle body 62, and the intake pipe 57, is connected to the rear surface of the cylinder head 43.

A throttle valve 63 is provided in the intake passage 56 of the throttle body 62, and an actuator 65 is provided on a side of the throttle body 62. The actuator 65 is provided with a reduction gear train for transmitting motor driving force to a valve shaft 64 of the throttle valve 63 and an electronic board for motor control. The electronic board is accommodated inside a rectangular side surface cover 66 of the actuator 65, and this side surface cover 66 is attached to the throttle body 62 facing an outside of the vehicle. The motor driving force is transmitted to the valve shaft 64 by the actuator 65, and the throttle valve 63 in the intake passage 56 is opened and closed to adjust an amount of intake air.

An exhaust pipe 51 is connected to a front surface of the cylinder head 43. As described above, since the up-type muffler 34 (see FIG. 1) is adopted in the straddle-type vehicle 1 of the present embodiment, the exhaust pipe 51 extending downward from the front surface of the cylinder head 43 extends rearward through a right side (side) of the cylinder 42 and is connected to the muffler 34 near the seat 26. The clutch cover 48 of the crankcase 41 bulges outward in the vehicle width direction than the cylinder 42, and a space above the clutch cover 48 is used as a space for disposing the exhaust pipe 51. In this way, even when the exhaust pipe 51 passes through the right side of the engine 40, an increase in a vehicle width dimension is prevented.

Figure 4:
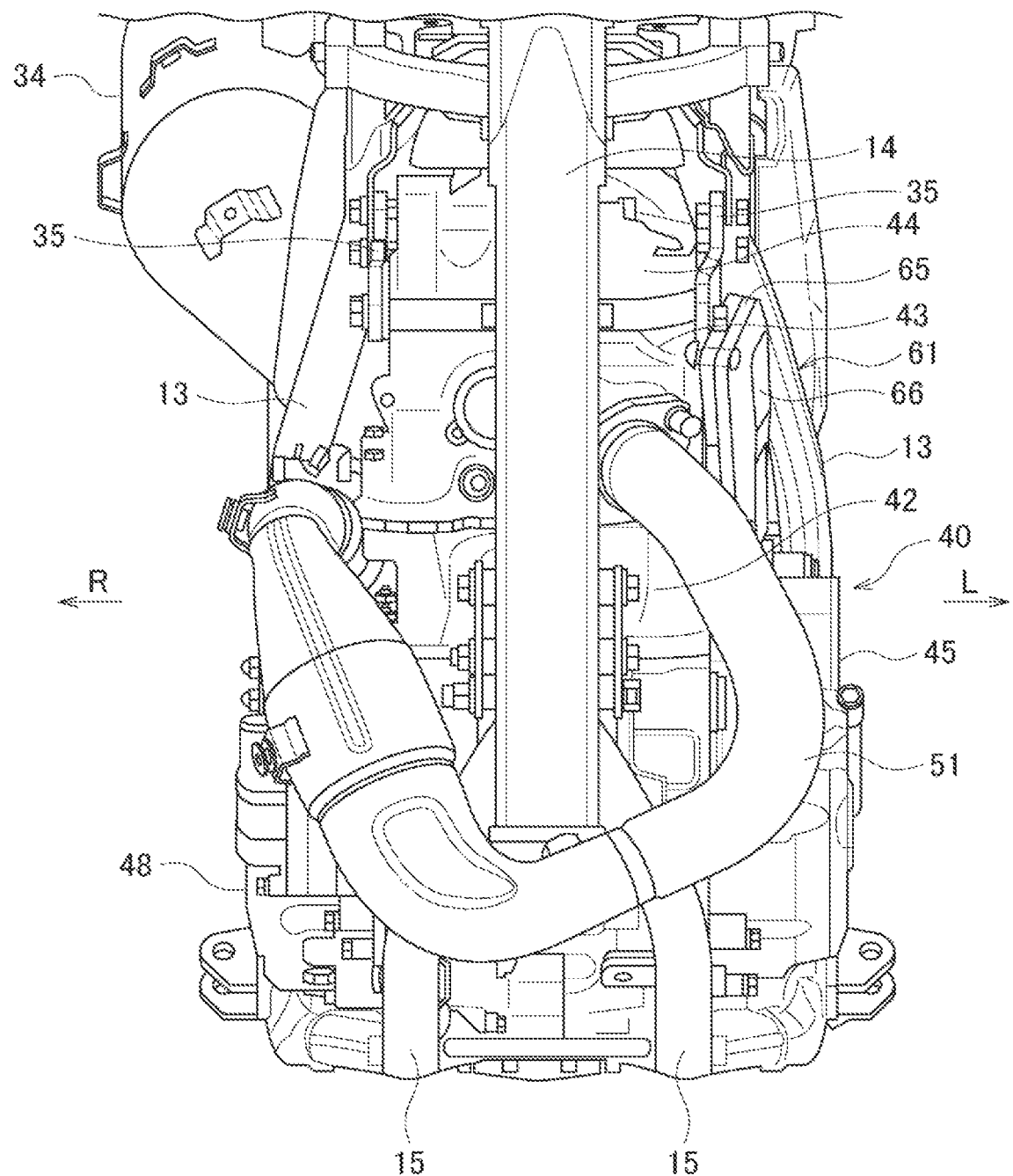
FIG. 4 is a front view of the engine of the present embodiment.
Figure 5:
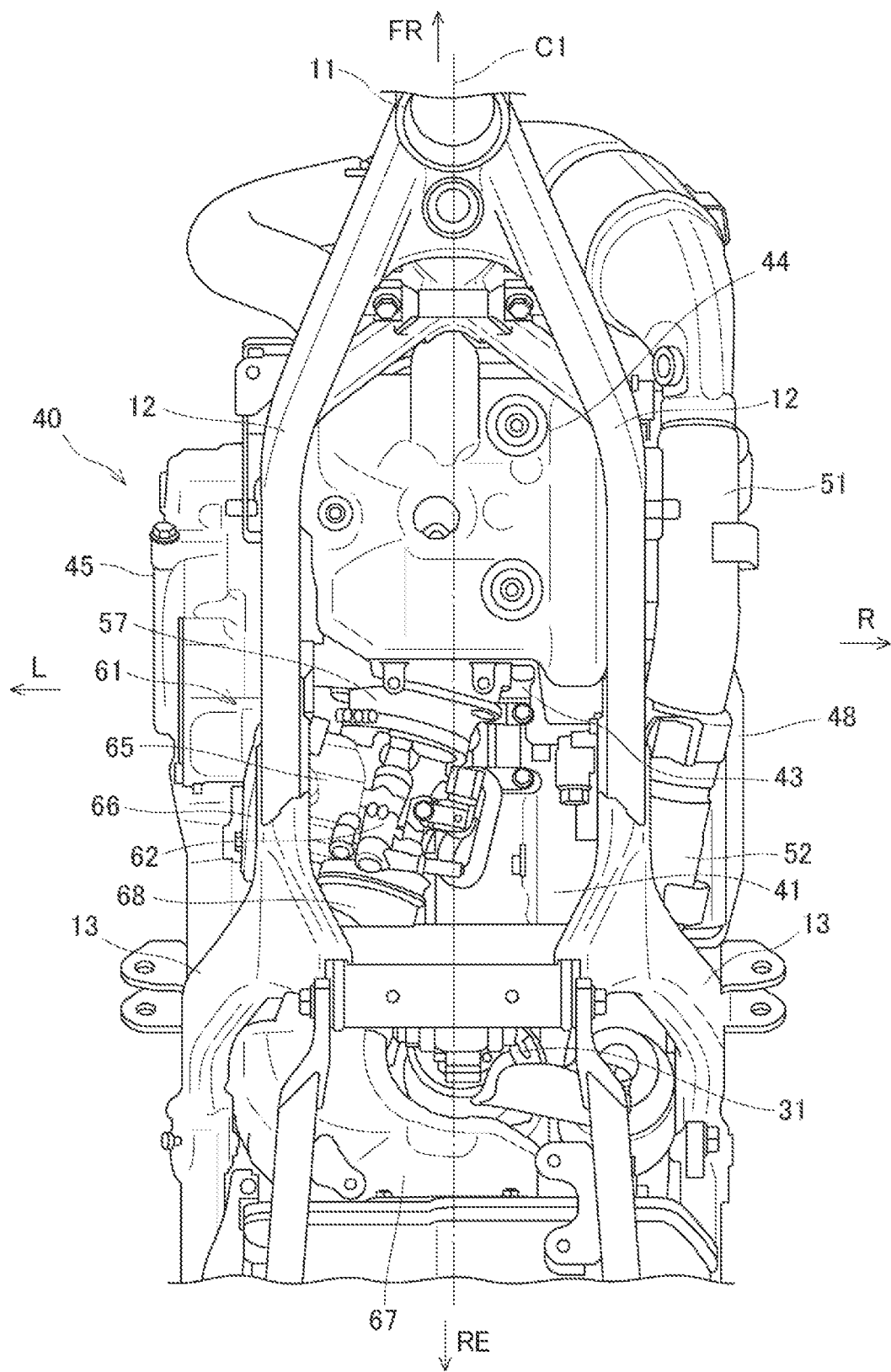
FIG. 5 is a top view of the engine of the present embodiment.
Figure 6:
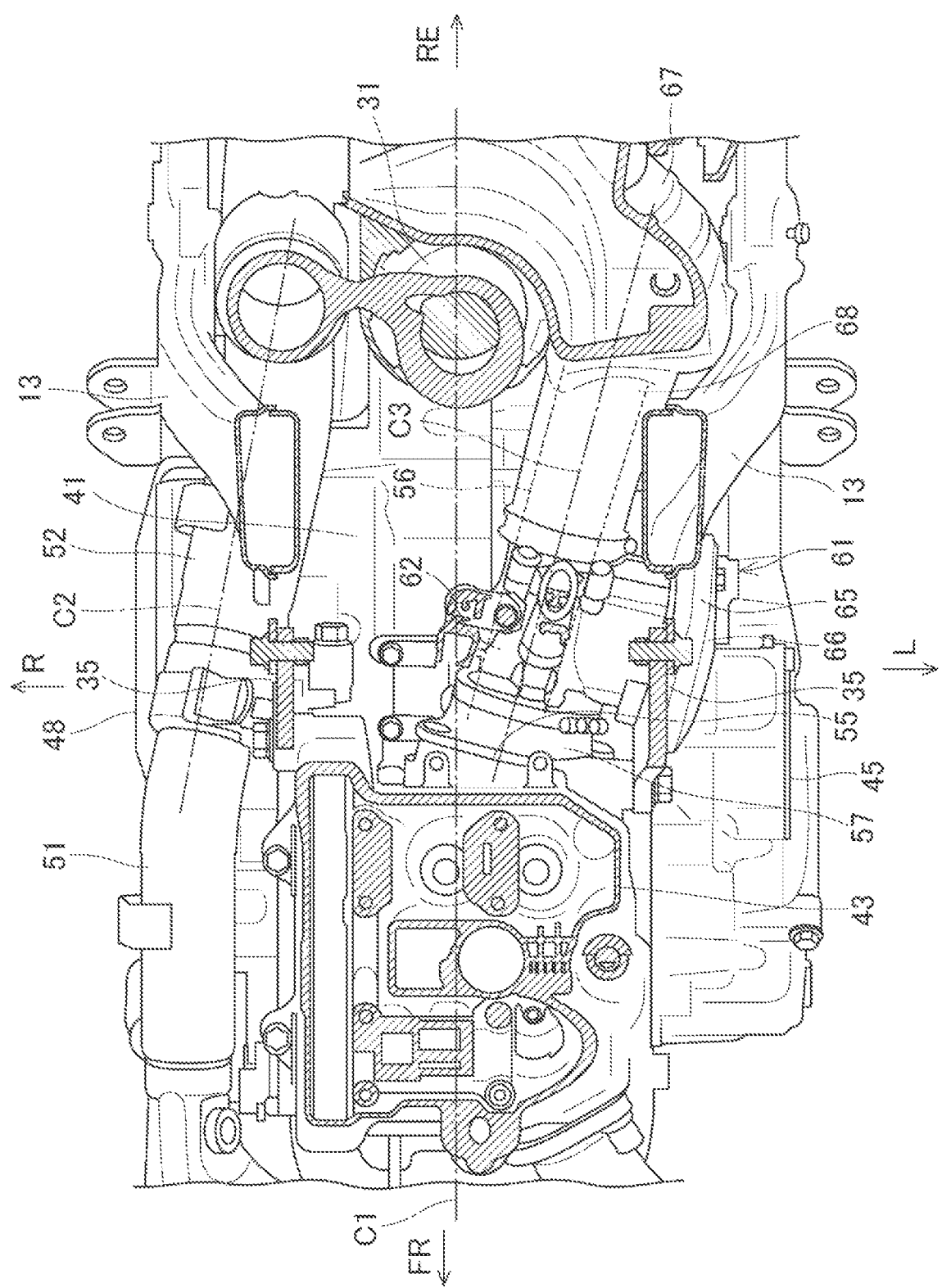
FIG. 6 is a cross-sectional view of the engine in FIG. 2 taken along a line A-A.

Layout of the engine will be described with reference to FIGS. 4 to 6. FIG. 4 is a front view of the engine of the present embodiment. FIG. 5 is a top view of the engine of the present embodiment. FIG. 6 is a cross-sectional view of the engine in FIG. 2 taken along a line A-A.

As shown in FIGS. 4 and 5, the exhaust pipe 51 extends diagonally downward to the left from the front surface of the cylinder head 43 so as to avoid the down frame 14, passes through the front side of the under frame 15, and curves diagonally upward to the right. Since the exhaust pipe 51 is largely curved using the space in front of the vehicle body, the engine 40 is adjusted to a desired output, and a radius of curvature of the curved portion is increased to reduce exhaust resistance. In a front view, the exhaust pipe 51 is positioned inward in the vehicle width direction than the outer surface (left side surface) of the magneto cover 45 and the outer surface (right side surface) of the clutch cover 48, and even when the exhaust pipe 51 is largely curved in front of the vehicle body, the increase in the vehicle width dimension is prevented.

The exhaust pipe 51 goes around the down frame 14 and passes through the right side of the cylinder 42, and the actuator 65 of the electronically controlled throttle 61 is disposed on an opposite side of the exhaust pipe 51 with respect to a vehicle center line C1 extending in a vehicle front-rear direction. Since the actuator 65 is sufficiently spaced apart from the exhaust pipe 51 in the vehicle width direction, the actuator 65 is less likely to be exposed to hot air of the exhaust pipe 51. That is, the hot air from the exhaust pipe 51 tends to flow upward, and the actuator 65 is spaced apart from the exhaust pipe 51 in the vehicle width direction so as to avoid the hot air from the exhaust pipe 51. In this way, heat damage to the electronic board and the like of the actuator 65 is prevented.

The electronically controlled throttle 61 is disposed in the intake passage 56 (see FIG. 6) behind the cylinder head 43 so that the actuator 65 is on the outside in the vehicle width direction. By positioning the intake passage 56 between the exhaust pipe 51 and the actuator 65, heat damage to the actuator 65 is more effectively prevented. The electronic board is accommodated in the side surface cover 66 of the actuator 65 (a part of the actuator 65), and this side surface cover 66 is positioned outside than the cylinder head 43 in the vehicle width direction. The actuator 65 is displaced away from a rear side of the cylinder head 43 where hot air tends to get accumulated, and the electronic board inside the side surface cover 66 is cooled by traveling wind, and therefore the heat damage to the electronic board, which is sensitive to heat, is prevented.

An outer surface of the side surface cover 66 of the actuator 65 (an outer surface of the actuator 65) is tilted rearward to the outside in the vehicle width direction (see especially FIG. 6). A rear portion of the outer surface of the side surface cover 66 is at the same position as outer surfaces of the body frames 13 in the vehicle width direction, and a step between the outer surface of the side surface cover 66 and the outer surfaces of the body frames 13 is small (see FIG. 4). The traveling wind flows smoothly along the outer surface of the side surface cover 66 and the outer surfaces of the body frames 13, so that air resistance is reduced and it becomes easier to exhaust hot air from the rear side of the engine 40. Hot air is less likely to accumulate around the actuator 65, and temperature rise of the electronic board inside the side surface cover 66 is prevented.

The actuator 65 is positioned below the suspension bracket 35 and in front of the body frames 13 (see FIG. 2). In a side view, the exhaust pipe 51 is positioned below the valve shaft 64 of the throttle valve 63 (see FIG. 3), and the side surface cover 66 of the actuator 65 overlaps the exhaust pipe 51. As described above, since the exhaust pipe 51 and the actuator 65 are spaced apart from each other in the vehicle width direction, the actuator 65 is not exposed to the hot air of the exhaust pipe 51 even when the exhaust pipe 51 and the actuator 65 overlap each other in the side view. Therefore, the exhaust pipe 51 and the actuator 65 are brought close to each other in an up-down direction, and the actuator 65 is disposed compactly behind the cylinder head 43.

The actuator 65 overlaps the main frames 12 in a top view, and the actuator 65 overlaps the body frames 13 in the front view. At the rear side of the single-cylinder engine 40, distances between parts are close and the hot air tends to accumulate, but since the actuator 65 protrudes outward from the engine 40 in the vehicle width direction, the heat damage to the actuator 65 is prevented. In the top view, the actuator 65 overlaps the suspension bracket 35 (see FIG. 6). By bringing the actuator 65 closer to the suspension bracket 35, which is cooler than the cylinder head 43, the temperature rise of the actuator 65 is prevented.

In the front view, the entire electronically controlled throttle 61 is positioned inward in the vehicle width direction than the outer surfaces of the body frames 13, and the electronically controlled throttle 61 is protected by the body frames 13 when the vehicle falls or the like. The electronically controlled throttle 61 does not protrude outward in the vehicle width direction than the body frames 13, and even when the electronically controlled throttle 61 is covered with a guard or rigging, protrusion of the guard or rigging can be minimized. Therefore, the electronically controlled throttle 61 does not impair a riding position of a driver. In this way, the electronically controlled throttle 61 can be displaced without affecting the existing layout.

As shown in FIG. 6, the air cleaner 67 is positioned behind the rear suspension 31 at the center of the vehicle body. The outlet tube 68 extends forward from a left side of the air cleaner 67 passing through a left side of the rear suspension 31. A mounting surface 55 for the intake pipe 57 is formed on the rear surface of the cylinder head 43 on the left of the vehicle center line C1. The mounting surface 55 is tilted rearward to the left so as to face the outlet tube 68. The outlet tube 68 is connected to the mounting surface 55 via the intake pipe 57 and the throttle body 62 of the electronically controlled throttle 61, and the intake passage 56 is formed linearly by the intake pipe 57, the throttle body 62, and the outlet tube 68.

The outlet tube 68 is positioned on the left side of the rear suspension 31 so that the outlet tube 68 avoids the rear suspension 31. Unlike the configuration in which the position of the rear suspension 31 is displaced rearward to ensure the intake passage 56, the position of the rear wheel 29 does not change, so that the wheelbase will not be extended. Unlike the configuration in which the rear suspension 31 is attached to the intake passage 56 from below to ensure the intake passage 56, there is no need to raise the seat height, lower the minimum ground clearance, or shorten a stroke of the rear suspension 31.

In this way, on the opposite side of the exhaust pipe 51 with respect to the vehicle center line C1, the intake passage 56 is tilted diagonally rearward to the left from the cylinder head 43 so that the outlet tube 68, which is the upstream side of the intake passage 56, is on the outside in the vehicle width direction. Instead of the intake passage 56 extending rearward along the vehicle center line C1, the intake passage 56 extends rearward away from the vehicle center line C1 to the left side, and most part of the intake passage 56 is positioned to the left side of the vehicle center line C1. The actuator 65 of the electronically controlled throttle 61 is arranged sufficiently away from the exhaust pipe 51, so that the heat damage to the actuator 65 is prevented. By passing the intake passage 56 on the opposite side of the exhaust pipe 51, a degree of freedom in designing the intake passage 56 is improved.

The exhaust pipe 51 is provided with a diagonal pipe 52 that extends diagonally rearward from one side position of the cylinder 42 inward in the vehicle width direction in the top view. The diagonal pipe 52 extends diagonally rearward to the left from one side of the cylinder 42, and as described above, the intake passage 56 also extends diagonally rearward to the left from the cylinder head 43. A center line C2 of the diagonal pipe 52 is parallel to a center line C3 of the intake passage 56, and the diagonal pipe 52 and the intake passage 56 are separated by an certain distance over the entire length. In order to prevent the increase in the vehicle width dimension and the heat damage to the outside of the vehicle, a sufficient distance between the diagonal pipe 52 and the actuator 65 is ensured even when the diagonal pipe 52 is disposed on the inside in the vehicle width direction.

As described above, according to the engine 40 of the present embodiment, even though the electronically controlled throttle 61 is disposed in the intake passage 56 and the exhaust pipe 51 passes through the right side of the cylinder 42, the actuator 65 of the electronically controlled throttle 61 is sufficiently spaced from the exhaust pipe 51 in the vehicle width direction. The actuator 65 can be arranged away from the exhaust pipe 51 without raising the seat height or lengthening the wheelbase. Therefore, even in the vehicle with the up-type muffler 34, the heat damage to the actuator 65 can be prevented while preventing the increase in size and width of the vehicle.

Note that in the present embodiment, the exhaust pipe passes behind the right side of the cylinder, and the actuator is disposed on the left side of the vehicle body, but the exhaust pipe may pass behind the left side of the cylinder, and the actuator may be disposed on the right side of the vehicle body. Here, passing behind a side of the cylinder means passing not directly beside the cylinder but on a side of the cylinder assembly including the cylinder head.

In the present embodiment, the cylinder is fixed to the upper surface of the crankcase, but the crankcase and the cylinder may be integrally formed.

In the present embodiment, a single-cylinder engine is exemplified, but the type of engine is not particularly limited.

In the present embodiment, the center line of the diagonal pipe of the exhaust pipe and the center line of the intake passage are parallel, but an extending direction of the exhaust pipe and an extending direction of the intake passage are not particularly limited. The center line of the diagonal pipe and the center line of the intake passage being parallel to each other does not mean that the center line of the diagonal pipe and the center line of the intake passage being completely parallel to each other. The center line of the diagonal pipe and the center line of the intake passage may be approximately parallel to each other to the extent that it can be assumed that the center line of the diagonal pipe extends along the center line of the intake passage.

In the present embodiment, the rear portion of the outer surface of the actuator is at the same position as the outer surfaces of the body frames in the vehicle width direction, but the positional relation between the outer surface of the actuator and the outer surfaces of the body frames is not particularly limited. The rear portion of the outer surface of the actuator being at the same position as the outer surfaces of the body frames in the vehicle width direction means that the rear portion of the outer surface of the actuator and the outer surfaces of the body frames may be misaligned within an extent that they can be considered to be at the same position in the vehicle width direction.

In the present embodiment, the actuator has a plate-shaped side surface cover, but the shape of the actuator is not particularly limited.

The engine of the present embodiment is applicable not only to the above-mentioned off-road straddle-type vehicle but also to other transports such as the All Terrain Vehicle (ATV) and water bikes. Note that the straddle-type vehicle is not limited to a general vehicle in which a driver rides on a seat in a posture of straddling the seat, and includes a scooter-type vehicle in which the driver rides on the seat without straddling the seat.

As described above, a first aspect includes: a cylinder (42) and a cylinder head (43) stacked on an upper portion of a crankcase (41); an electronically controlled throttle (61) interposed in an intake passage (56) behind the cylinder head; and an exhaust pipe (51) extending rearward from the cylinder head through a side of the cylinder, in which the electronically controlled throttle includes a throttle valve (63) provided in the intake passage and an actuator (65) that opens and closes the throttle valve, and the actuator is disposed on an opposite side of the exhaust pipe with respect to a vehicle center line (C1) extending in a vehicle front-rear direction. According to this configuration, even when the electronically controlled throttle is disposed in the intake passage and the exhaust pipe passes through the side of the cylinder, the actuator of the electronically controlled throttle is sufficiently spaced apart from the exhaust pipe in the vehicle width direction. The actuator can be arranged away from the exhaust pipe without raising the seat height or lengthening the wheelbase. Therefore, even in a vehicle with an up-type muffler, heat damage to the actuator can be prevented while preventing the increase in size and width of the vehicle.

In the first aspect, a second aspect is that the intake passage extends on the opposite side of the exhaust pipe with respect to the vehicle center line, such that an upstream side of the intake passage is on an outside in a vehicle width direction. According to this configuration, the exhaust pipe can be further spaced apart from the actuator. The degree of freedom in designing the intake passage is improved.

In the first aspect or the second aspect, a third aspect is that in a top view, the exhaust pipe extends diagonally rearward and inward in the vehicle width direction from a side position of the cylinder, and a center line (C2) of a diagonal pipe (52) of the exhaust pipe is parallel to a center line (C3) of the intake passage. According to this configuration, even when the exhaust pipe is disposed on the inside in the vehicle width direction, a sufficient distance between the exhaust pipe and the actuator is ensured.

In any one of the first aspect to the third aspect, a fourth aspect is that the electronically controlled throttle is disposed in the intake passage such that the actuator is on the outside in the vehicle width direction. According to this configuration, heat damage to the actuator can be further prevented by positioning the intake passage between the exhaust pipe and the actuator.

In any one of the first aspect to the fourth aspect, a fifth aspect is that a part (side surface cover 66) of the actuator overlaps the exhaust pipe in a side view. According to this configuration, the exhaust pipe and the actuator are brought close to each other in the up-down direction, and the actuator is disposed compactly.

In any one of the first aspect to the fifth aspect, a sixth aspect is that a part of the actuator is positioned outside than the cylinder head in the vehicle width direction. According to this configuration, the actuator is cooled by traveling wind, and heat damage to the actuator is prevented.

In any one of the first aspect to the sixth aspect, a seventh aspect is that an outer surface of the actuator is tilted rearward to the outside in the vehicle width direction.

According to this configuration, the traveling wind flows along the outer surface of the actuator, so that air resistance is reduced, and it becomes easy to exhaust hot air from the rear side of the engine, so that temperature rise of the actuator is prevented.

Although the present embodiment has been described, as another embodiment, the above-described embodiment and modification may be combined entirely or partially.

The technique according to the present invention is not limited to the above-described embodiment, and may be variously changed, replaced, or modified without departing from the gist of the technical concept. Further, the present disclosure may be implemented by other methods as long as the technical concept can be implemented by the methods through advance of the technique or other derivative techniques. Accordingly, the claims cover all embodiments that may fall within the scope of the technical spirit.

What is claimed is:

1. An engine, comprising:
a cylinder and a cylinder head stacked on an upper portion of a crankcase;
an electronically controlled throttle interposed in an intake passage behind the cylinder head; and
an exhaust pipe extending rearward from the cylinder head through a side of the cylinder, wherein
the electronically controlled throttle includes a throttle valve provided in the intake passage and an actuator that opens and closes the throttle valve, and
the actuator is disposed on an opposite side of the exhaust pipe with respect to a vehicle center line extending in a vehicle front-rear direction.

2. The engine according to claim 1, wherein
the intake passage extends on the opposite side of the exhaust pipe with respect to the vehicle center line, such that an upstream side of the intake passage is on an outside in a vehicle width direction.

3. The engine according to claim 1, wherein
in a top view, the exhaust pipe extends diagonally rearward and inward in the vehicle width direction from a side position of the cylinder, and a center line of a diagonal pipe of the exhaust pipe is parallel to a center line of the intake passage.

4. The engine according to claim 1, wherein
the electronically controlled throttle is disposed in the intake passage such that the actuator is on the outside in the vehicle width direction.

5. The engine according to claim 1, wherein
a part of the actuator overlaps the exhaust pipe in a side view.

6. The engine according to claim 1, wherein
a part of the actuator is positioned outside than the cylinder head in the vehicle width direction.

7. The engine according to claim 1, wherein
an outer surface of the actuator is tilted rearward to the outside in the vehicle width direction.

* * * * *